United States Patent [19]

Nall et al.

[11] Patent Number: 4,646,413

[45] Date of Patent: Mar. 3, 1987

[54] TUBE EXTRACTOR DRILL JIG

[75] Inventors: Lawson H. Nall, Folsom; William E. Sandford, Camino, both of Calif.

[73] Assignee: Tri Tool Inc., Rancho Cordova, Calif.

[21] Appl. No.: 746,029

[22] Filed: Jun. 18, 1985

[51] Int. Cl.4 .......................... B23P 7/00; B23B 49/02
[52] U.S. Cl. ................................. 29/402.03; 29/426.4; 29/558; 408/54; 408/72 R; 408/82; 408/115 R
[58] Field of Search ............... 408/81, 103, 97, 115 R, 408/115 B, 72 R, 72 B, 241 R, 241 B, 54, 82; 29/402.03, 402.08, 426.4, 426.6, 557, 558, 726; 409/189; 82/DIG. 3

[56] References Cited

U.S. PATENT DOCUMENTS

| | | | |
|---|---|---|---|
| 820,965 | 5/1906 | Froggatt | 408/115 R |
| 1,372,378 | 3/1921 | Walker | 408/115 R |
| 1,883,662 | 10/1932 | Fisher | 29/426.4 |
| 2,181,450 | 11/1939 | Davenport . | |
| 2,193,764 | 3/1940 | Soos | 408/54 X |
| 2,227,348 | 12/1940 | Johnson . | |
| 2,232,374 | 2/1941 | Drews | 408/115 R |
| 2,289,631 | 7/1942 | Cuda et al. . | |
| 2,300,914 | 11/1942 | Flindt . | |
| 2,408,450 | 10/1946 | Schrader | 29/402.03 X |
| 2,411,246 | 11/1946 | Clapper . | |
| 2,547,986 | 4/1951 | Dermark | 29/426.4 |
| 2,670,639 | 3/1954 | Flowers et al. | 29/402.03 X |
| 3,613,212 | 10/1971 | Miller | 29/726 |

Primary Examiner—Gil Weidenfeld
Assistant Examiner—Glenn L. Webb
Attorney, Agent, or Firm—Bacon & Thomas

[57] ABSTRACT

The invention relates to a drill jig assembly for use in the removing a tube from a wall structure. the device fits within the tube and defines drill guide grooves along its length such that, a rotating drill inserted into the guide grooves will cut away a portion of the wall thickness of the tube. When portions of the tubing wall thickness have been reduced, the tube may be readily inwardly collapsed so as to easily remove it from the wall structure.

8 Claims, 7 Drawing Figures

SEC. A-A

SEC. B-B

SEC. C-C

TUBE EXTRACTOR DRILL JIG

FIELD OF THE INVENTION

The instant invention relates to a drill jig assembly, specifically such an assembly utilized to guide drills so as to remove a portion of the wall thickness of a tube which is to be removed from a surrounding wall structure.

BRIEF DESCRIPTION OF THE PRIOR ART

Power generating systems of all sizes and types typically utilize heat exchangers and/or boilers of the tube type. Tube type elements such as these have a plurality of relatively thin walled tubes passing through a relatively thicker wall section of a surrounding structure and serve as effective means to transfer heat from one medium to another.

While these devices are well known in the art, the high temepratures and generally corrosive operating parameters to which they are subjected often causes the relatively thin walls of the tubes to develop holes or cracks. The size and complexity of the heat exchange devices makes it economically unsound to replace the entire structure when one or more of the tubes develops a hole or crack. Therefore, many devices have been developed over the years to remove only those tubes which are defective such that they may be replaced by a new heat exchanging tube.

Typically, the heat exchange tubes are retained in the wall of the structure by deforming the end of the tube, deforming a mid portion of the tube into a corresponding recess in the structure wall, or by welding the ends of the tubes to the wall structure. The prior art devices have generally relied upon machine tool cutters to cut away the external weld bead, the deformed end portion of the tube, or to cut away the wall thickness of the tube where it passes through the structure wall. While these devices have generally been effective, great care must be taken when using these devices in order to prevent any inadvertent defacing of the heat exchange structure wall which would necessitate replacement of the entire device. Due to the extreme accuracy required and the extreme care which must be taken, the prior art devices have generally been proven to be time consuming and not generally cost effective.

SUMMARY OF THE INVENTION

The instant invention relates to a drill jig assembly which guides a rotating drill so as to cut away a portion of the wall thickness of the tube which extends through the wall structure of the device. It is particularly adaptable for use in those tubes which have portions which are deformed radially outwardly to engage a corresponding groove in the wall of the structure so as to retain the tubes in place.

The assembly comprises a drill guide shaft which defines a plurality of longitudinally extending drill guide grooves in its periphery, a drill guide head attached to one end of the drill guide shaft, and means to attach the drill guide shaft to the interior of the tube. The drill guide head has a plurality of openings extending therethrough, which are aligned with the drill guide grooves of the guide shaft. Radially expanding and contracting gripping jaws are disposed in jaw guide grooves, also defined in the periphery of the drill guide shaft such that, after the shaft has been inserted into the tube, the jaw members may be radially expanded to lock it into place.

A standard rotating drill, which may be either hand held or machine operated is then sequentially passed into the drill guide grooves. The depth of the drill guide grooves are less than the diameter of the drill such that a portion of the wall thickness of the tube is cut away as the drill passes along the guide grooves. A plurality of such cuts are made prior to withdrawing the drill jig assembly from the tube. After withdrawal, the tube may be radially inwardly collapsed by any known means, the reduced wall thickness portions serving to facilitate such inward collapse. Once the outer diameter of the tube has been reduced by collapsing, it may be readily removed from the wall structure.

DETAILED DESCRIPTION OF THE PREFERRED EMBODIMENT

Figure 1:
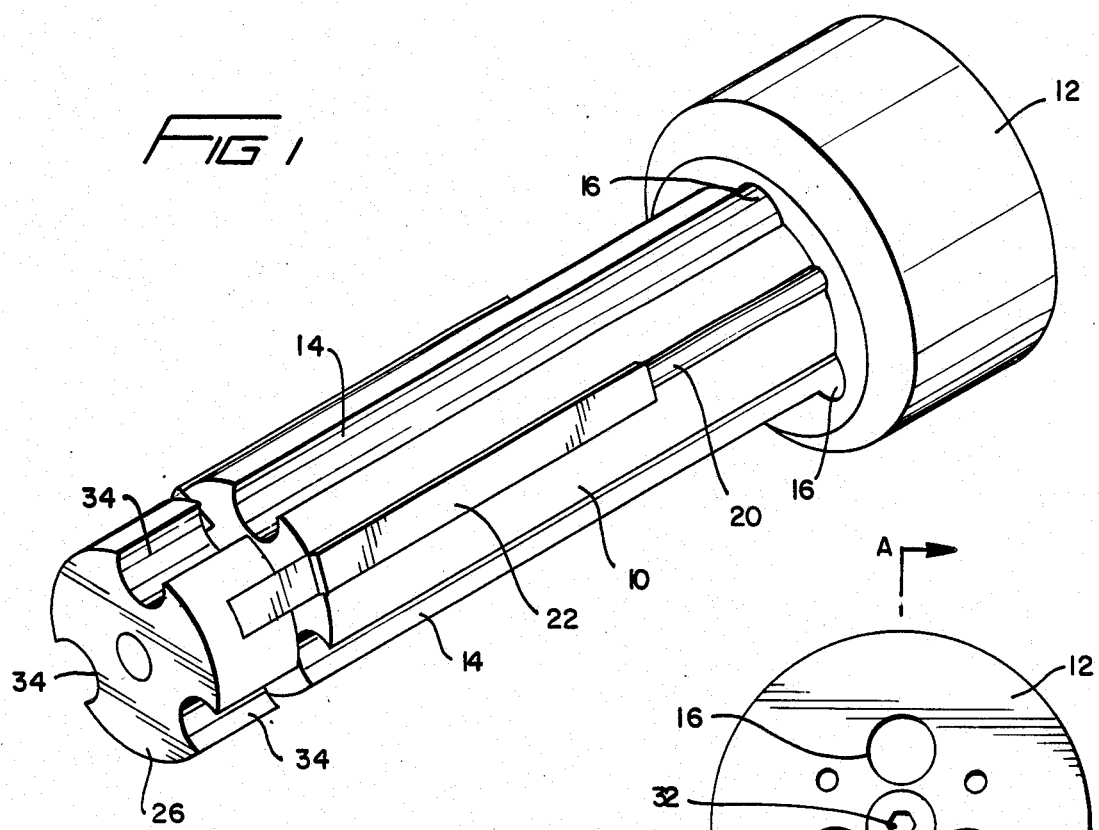
FIG. 1 is a perspective view showing the drill jig assembly according to the invention.
Figure 2:
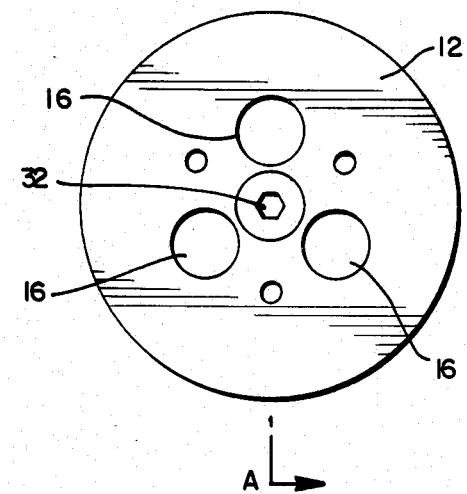
FIG. 2 shows an end view of the drill jig assembly shown in FIG. 1.

The drill jig assembly according to the invention is shown in perspective in FIG. 1 and comprises drill guide shaft 10 having drill guide head 12 attached to a first end thereof. Drill guide shaft 10 defines a plurality of drill guide grooves 14 about its periphery. Drill guide grooves 14 extend longitudinally along the drill guide shaft 10 generally parallel to the longitudinal axis of guide shaft 10.

Drill guide head 12 defines a plurality of openings 16 which extend generally parallel to the longitudinal axis of the drill guide shaft and are each aligned with a drill guide groove 14.

Drill guide shaft 10 also defines a central longitudinal opening 18 which extends throughout the length of the assembly generally coincident with its longitudinal axis. A plurality of jaw guide grooves 20 are also defined by the periphery of drill guide shaft 10 such that they extend generally parallel to the longitudinal axis of the drill guide shaft and alternate with the drill guide grooves 14 about the periphery of the drill guide shaft 10. A gripping jaw member 22 is slidably received in each jaw guide groove 20, as shown best in FIG. 3. A rotatable drive member 24 comprising head portion 24a, cylindrical rotating portion 24b and externally threaded portion 24c extends through the central longitudinal opening 18 such that a portion of the externally threaded section 24c extends from a second end of the drill guide shaft 10. A jaw drive plate 26 is threadingly engaged onto portion 24c and has pin 28 extending through slot 30 in gripping jaw members 22 so as to attach each of the gripping jaw members 22 to the drive plate 26.

Figure 3:
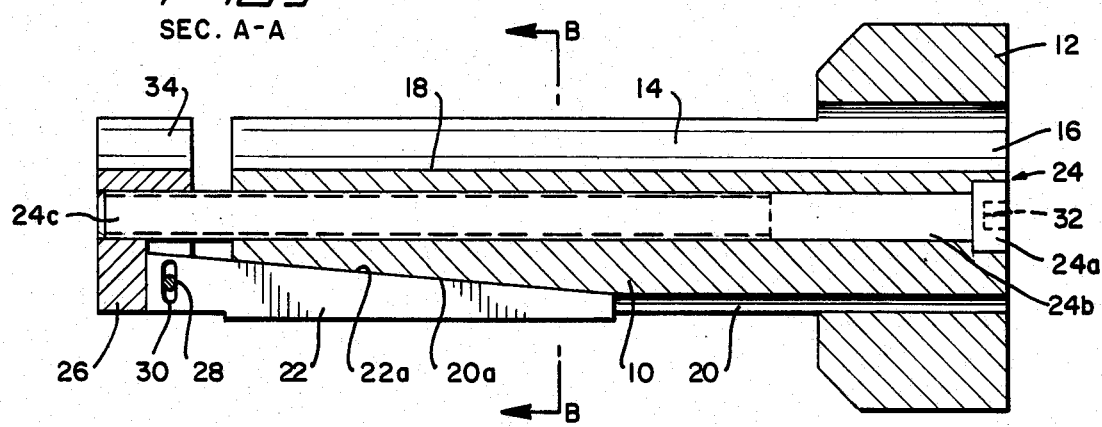
FIG. 3 is a longitudinal sectional view taken along line A—A in FIG. 2.
Figure 4:
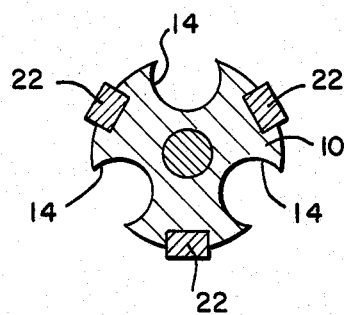
FIG. 4 is a cross sectional view taken along line B—B in FIG. 3.

The base of each of the jaw guide grooves 20 has tapered portion 20a which tapers downwardly in a direction away from the drill guide head 12. Similarly, each of the gripping jaw members 22 has a corresponding tapered surface 22a which slidably engages tapered surface 20a. The corresponding tapered surfaces act as wedge cam surfaces which radially expand or retract the gripping jaw members 22 as the drive plate is moved in a direction generally parallel to the longitudinal axis of the assembly. This actuating motion is imparted to the drive plate 26 by rotation of the drive member 24, which may be manually rotated by insertion of a tool into the corresponding recess opening 32. Thus, as seen in FIG. 3, rotation of drive member 24 causes the drive plate 26 to move along the longitudinal axis, since the drive plate 26 cannot rotate due to its connection with the gripping jaw members 22 and their engagement with the jaw guide slots 20. As drive plate 26 moves to the right, as shown in FIG. 3, the gripping jaw members 22 will expand radially outwardly, while movement in the opposite direction will cause them to retract. Drive plate 26 has grooves 34 correspondingly shaped and aligned with the drill guide grooves 14 of the drill guide shaft.

Figure 5:
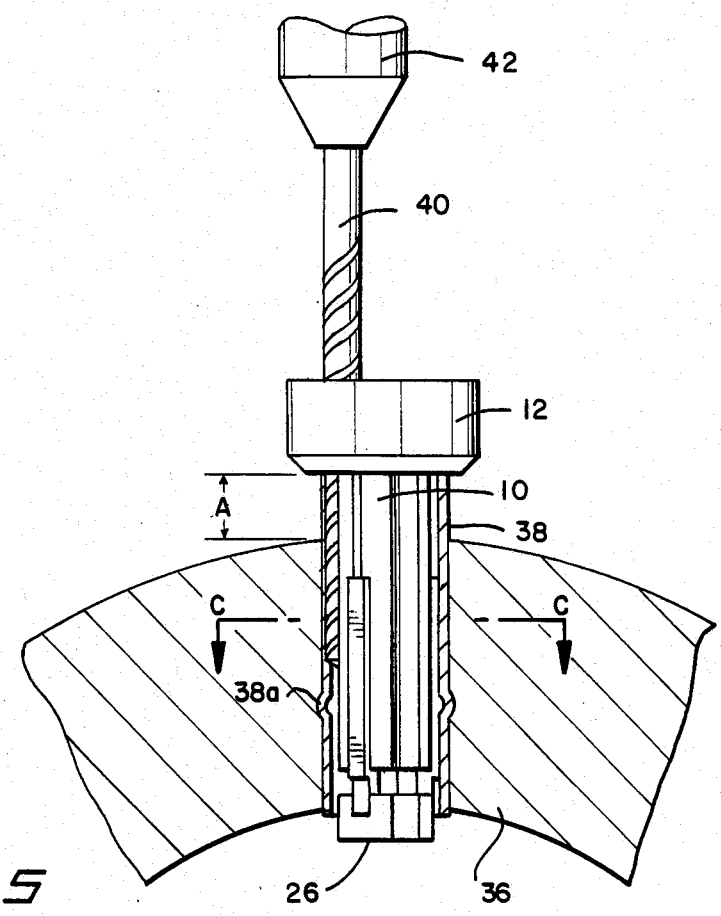
FIG. 5 is a side view, partially in section, showing the drill jig assembly according to the invention inserted into a tube and guiding a rotating drill.

FIG. 5 shows a cross section through a wall structure 36 which may be a heat exchanger, boiler or other apparatus having a plurality of tubes 38 extending therethrough. Only one such tube 38 is shown in FIG. 5. Prior to using the device according to the invention, tube 38 is cut off a predetermined distance A from the wall structure 36 and the cut end is squared off utilizing known beveling tools. The drill guide shaft 10 is then inserted into the interior of tube 38 such that the drill bead 12 rests upon the squared off tube end. Drive member 24 is then rotated to move drive plate 26 and to cause the consequent expansion of the gripping jaw members 22 until they contact the interior surface of tube 38. This action locks the drill guide assembly into position within the tube 38. Tube 38, as shown, has enlarged annular portion 38a which fits into a corresponding recess formed in the wall 36 in order to secure the tube in assembled relationship.

Figure 6:
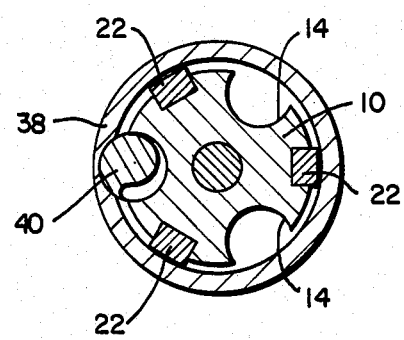
FIG. 6 is a cross sectional view taken along line C—C in FIG. 5.
Figure 7:
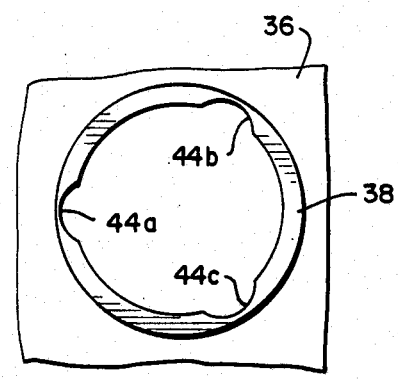
FIG. 7 is an end view of a tube having three portions of its wall section cut away so as to facilitate its deformation according to the invention.

Rotating drill 40 driven by drill mechanism 42 is then inserted into one of the openings 16 and moved along the drill guide groove 14. Since the diameter of the drill 40 is greater than the depth of the drill guide groove 14, a portion of the rotating drill extends outwardly beyond the diameter of the drill guide shaft 10 to cut away a portion of the wall thickness of tube 38 as shown in FIG. 6. The rotating drill 40 is fed inwardly until it passes through the tube on its opposite end. The drill is then removed and a similar process is carried out on the remaining drill guide grooves. Once all of the cutaway portions have been formed, the apparatus is removed from tube 38 by rotating the drive member 24 in an opposite direction so as to retract the gripping jaw members 22. Once the apparatus has been removed from tube 38, as shown in FIG. 7, it has three cutaway portions 44a, 44b, and 44c in which its wall thickness has been reduced. Tube 38 may then be deformed so as to reduce its outer diameter such that the enlarged portion 38a may be withdrawn from the corresponding groove in the wall structure 36. By inwardly deforming the tube 38 in this manner, it may be subsequently removed from wall structure 36 by application of a longitudinal force. The collapsing of the tube may be accomplished by a conical sleeve driven over one end of the tube or by any other known means. By reducing the wall thickness in various areas, the tube may be readily collapsed in a rapid manner with minimal force.

Although the drill guide assembly has been described as having three drill guide grooves equally displaced about its periphery, more or less grooves may be utilized depending upon the thickness, the diameter, and the hardness of the tubing material being removed. In some instances one or two cutaway areas may suffice to remove the tube, while larger or harder tubing materials may require more cutaway areas.

The foregoing description is provided for illustrative purposes only and should not be construed as in any way limiting the scope of this invention, which is defined solely by the appended claims.

What is claimed is:

1. A drill jig assembly for use in removing a portion of the wall thickness of a tube extending through a wall comprising:
    (a) a drill guide shaft having a longitudinal axis and at least one drill guide groove extending along the guide shaft generally parallel to the longitudinal axis;
    (b) a drill guide head attached to a first end of the drill guide shaft, the drill guide head defining at least one opening therethrough, the at least one opening extending generally parallel to the longitudinal axis and being aligned with a corresponding drill guide groove;
    (c) clamping means operatively associated with the drill guide shaft and circumferentially displaced from the at least one drill guide groove; and
    (d) drive means associated with the drill guide shaft and the clamping means to radially expand and contract the clamping means relative to the drill guide shaft to clamp the drill jig assembly to the interior of the tube whereby a rotating drill inserted through the at least one opening into a drill guide groove will cut away a portion of a wall of the tube.

2. The drill jig assembly according to claim 1 wherein a lateral dimension of the drill guide head is greater than that of the drill guide shaft.

3. The drill jig assembly according to claim 2 wherein the clamping means comprises:
    (a) a plurality of jaw guide grooves defined by the drill guide shaft and extending generally parallel to the longitudinal axis; and
    (b) a gripping jaw member slidably mounted in each jaw guide groove.

4. The drill jig assembly according to claim 3 wherein the drive means to expand and contract the jaw members comprises:
    (a) corresponding wedge cam surfaces formed on the gripping jaw members and the jaw guide grooves; and,
    (b) means to move the gripping jaw members along the wedge cam surfaces.

5. The drill jig assembly according to claim 4 wherein the drill guide shaft and the drill guide head define a central longitudinal opening and wherein the means to move the gripping jaw members along the wedge cam surfaces comprises:
    (a) a rotatable drive member extending through the central longitudinal opening, the drive member having a threaded portion extending from a second end of the drill guide shaft;

(b) a jaw drive plate threadingly engaged to the threaded portion of the rotatable drive member; and, (c) means to attach the gripping jaw members to the jaw drive plate.

6. The drill jig assembly according to claim 5 wherein the drill guide grooves and the jaw guide grooves alternate about the periphery of the drill guide shaft.

7. The drill jig assembly according to claim 6 wherein the drill guide shaft defines three drill guide grooves and three jaw guide grooves.

8. A method of removing a hollow tube extending through a wall of a structure comprising the steps of:

(a) attaching a drill guide to the interior of the tube;

(b) inserting a rotating drill through the drill guide such that a portion of the wall thickness of the tube is cut away along a path extending generally parallel to a longitudinal axis of the tube;

(c) deforming the tube along the cut away portions so as to reduce the outside dimensions of the tube; and, (d) removing the reduced tube from the wall of the structure.

* * * * *